Dec. 28, 1937.   P. F. SPERRY ET AL   2,103,599
AIR DISTRIBUTING MEANS
Filed April 18, 1936   3 Sheets-Sheet 1

Inventors:
Philmore F. Sperry
Donald W. Lake.
By Zabel, Carlson & Wills
Attorneys Dec. 28, 1937.   P. F. SPERRY ET AL   2,103,599
AIR DISTRIBUTING MEANS
Filed April 18, 1936   3 Sheets-Sheet 2

Inventors:
Philmore F. Sperry,
Donald W. Lake.
By Zabel, Carlson & Wild
Attorneys Dec. 28, 1937.    P. F. SPERRY ET AL    2,103,599
AIR DISTRIBUTING MEANS
Filed April 18, 1936    3 Sheets-Sheet 3
Fig. 5.
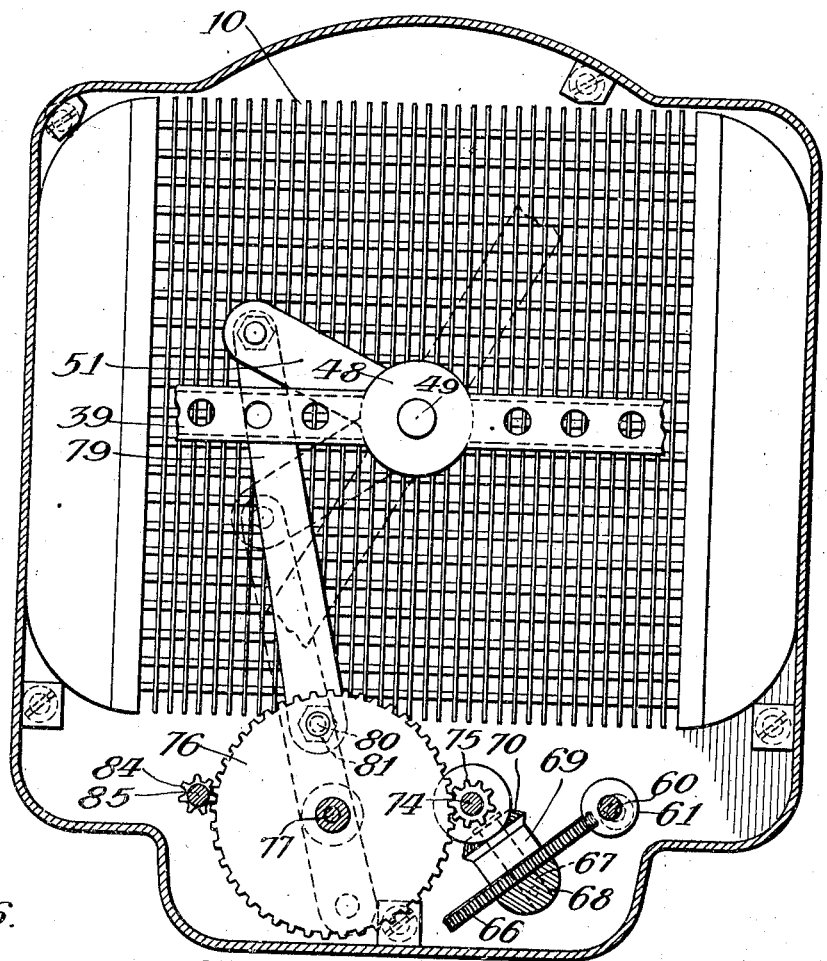
Fig. 6.
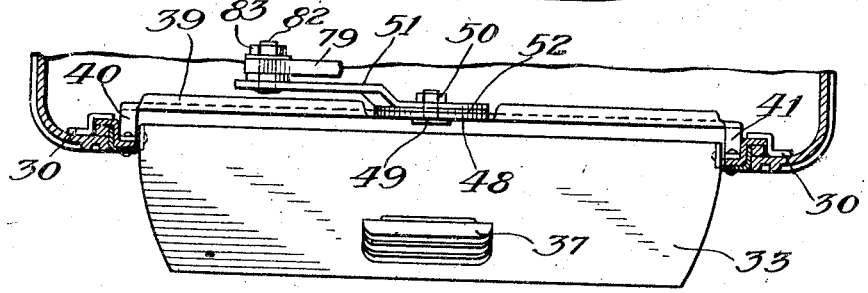
Fig. 7.    Fig. 8.
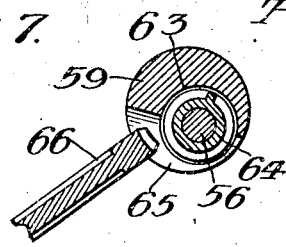    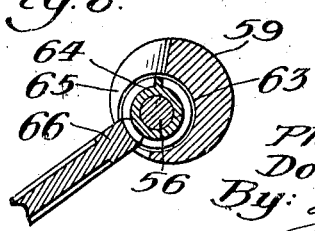
Inventors:
Philmore F. Sperry,
Donald W. Lake
By Zabel, Carlson & Wells
Attorneys Patented Dec. 28, 1937

2,103,599

UNITED STATES PATENT OFFICE 2,103,599

AIR DISTRIBUTING MEANS

Philmore F. Sperry and Donald W. Lake, Chicago, Ill., assignors to Excel Auto Radiator Company, Chicago, Ill., a corporation of Delaware Application April 18, 1936, Serial No. 75,125

6 Claims. (Cl. 230—274)

This invention relates to air distributing means for heaters such as are commonly used in passenger automobiles and the like.

The present invention is particularly adaptable to that type of structure wherein heat radiation is supplied by a heating fluid that is heated by the engine of the automobile and circulated through a heat radiator which is placed inside the passenger compartment of the automobile. These devices usually employ a motor driven fan for circulating the air within the passenger compartment through the heat radiator. The air flow through the heat radiator is regulated and directed by means of one or more shutters mounted in the housing for the heat radiator.

The present invention contemplates the provision of a device of this character wherein the position of the shutter or shutters may be manually adjusted and the flow of air thus regulated. Furthermore, means are provided for causing a power driven mechanism to continually vary the position of the shutters with respect to the direction in which they will cause the air to flow as it leaves the radiator.

More specifically, the invention provides a mechanism consisting of a plurality of shutters mounted upon a movable frame to substantially cover an aperture in the heat radiator housing, in which the shutters are individually adjustable to increase or decrease the area of the opening through the radiator housing, and in which the frame that carries the shutters is actuated by a suitable power driven means such as the fan motor to continuously vary the angular position of the shutters about an axis that is perpendicular to the plane of the opening in the radiator housing. The device is so constructed that the starting position of the shutters in their continuous movement can be set at any desired points, and the direction of the air leaving the heater thus be caused to flow in the direction which is most desired by the occupants of the automobile.

Other features and advantages of the invention will become apparent as the description proceeds, reference being had to the accompanying drawings wherein a preferred form of the invention is shown.

In the drawings—

Fig. 5 is a sectional view on the line 5—5 of Fig. 3;

Fig. 6 is a fragmentary sectional view on the line 6—6 of Fig. 3;

Fig. 7 is a sectional view on the line 7—7 of Fig. 4, showing the drive mechanism as disconnected; and Fig. 8 is a sectional view like Fig. 7 showing the drive mechanism connected.

Figure 1:
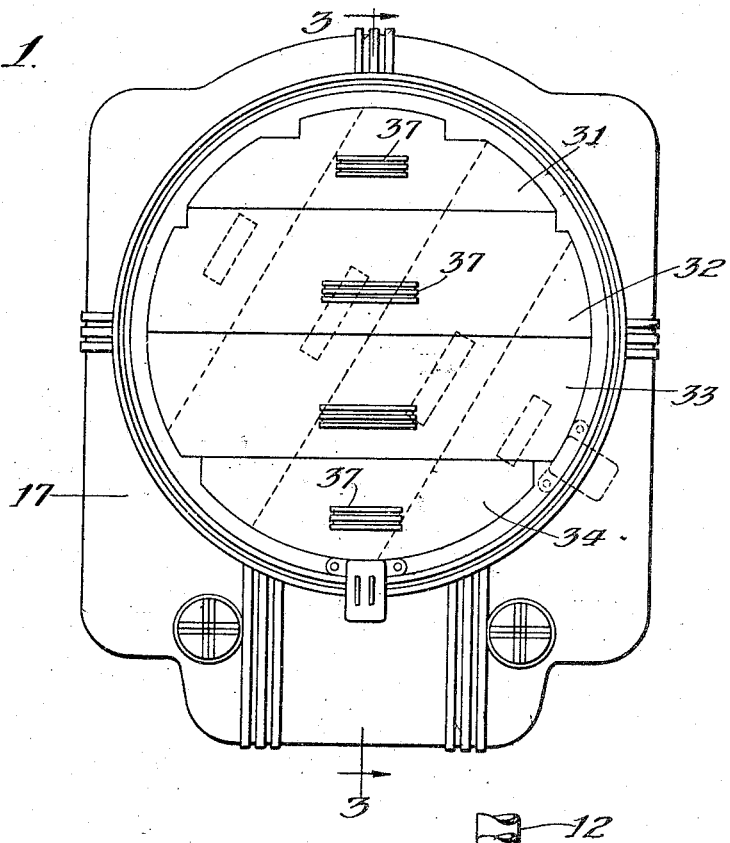
Fig. 1 is a front elevational view of an automobile heater to which the invention is applied.
Figure 2:
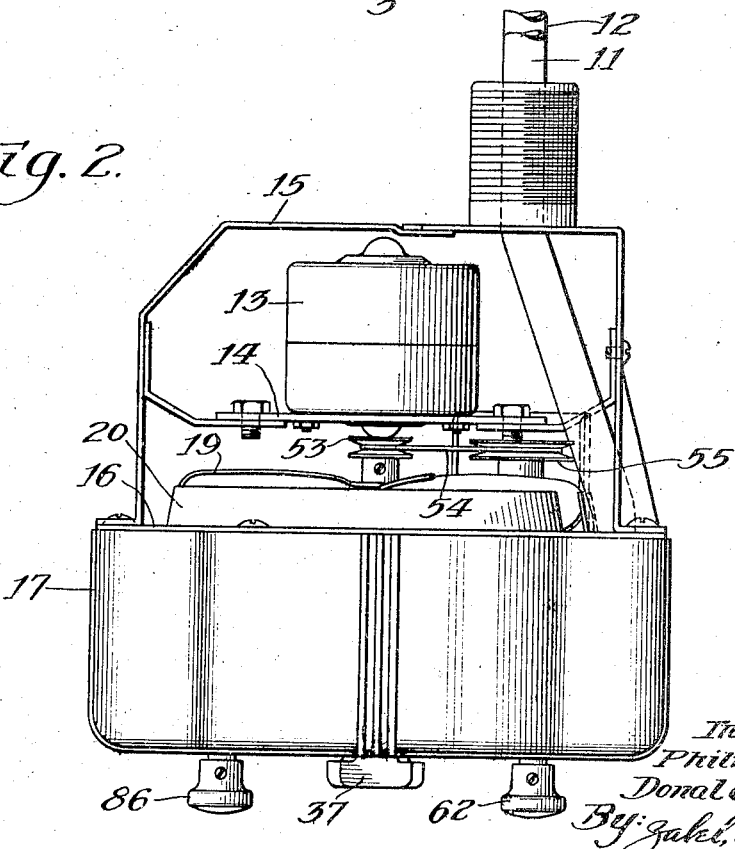
Fig. 2 is a top plan view of the heater to which the invention is applied.
Figure 3:
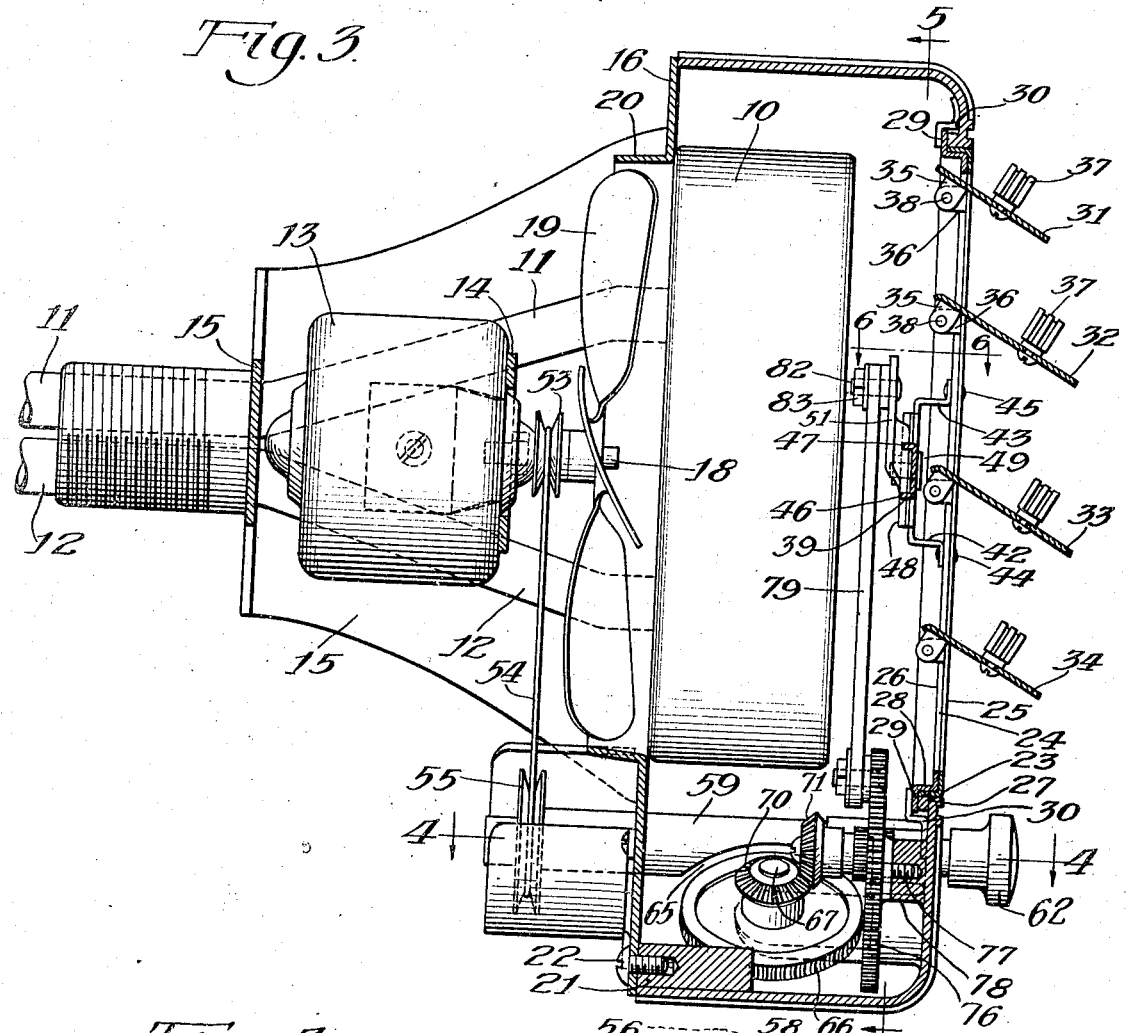
Fig. 3 is an enlarged sectional view on the line 3—3 of Fig. 1.

Referring now to the drawings, the invention is shown as applied to a heat radiator 10 which may be mounted upon a dash board of an automobile, suitable pipes 11 and 12 being provided for connecting the radiator 10 to a source of heated fluid which is heated by the automobile engine. A motor 13 is carried by a mounting plate 14 that is secured in a framework 15 at the back of the heater 10. This framework is secured upon a back plate 16 forming part of a housing 17 for the heater 10. The motor 13 has a shaft 18 on which is fixed a fan 19. The back plate 16 has a flange 20 in which the fan 14 is located.

Preferably, the housing 17 has therein a plurality of blocks 21 in which screws 22 are screw threaded to secure the back plate 16 in position. The housing 17 has a front face provided with an aperture 23 through which the air driven through the radiator 10 by the fan 19 is propelled out into the passenger compartment of the automobile. Rotatably secured in the aperture 23 is a frame 24. The frame 24 comprises a pair of rings 25 and 26 secured together in any suitable fashion. The ring 25 has a flange 27 which is journalled in the aperture 23. The ring 26 is offset at 28, as shown, and is provided with a radial retaining flange 29 which extends outwardly over a shoulder on the housing 17 so as to limit the outward movement of the rings 25 and 26 with respect to the housing. A plurality of retaining brackets 30 are welded or otherwise secured to the inner surface of the housing 17 and project over the flange 29 to hold the frame 24 in the aperture 23. This assembly provides a mounting for the frame 24 in the housing 17 so that the frame 24 may be rotated freely in the aperture 23.

The frame 24 carries a plurality of shutters 31, 32, 33, and 34. Obviously, any desired number of shutters may be used. These shutters are hinged by means of lugs 35 provided on each shutter to ears 36 formed on the ring 26. Each shutter is provided with a handle 37 by means of which it may be adjusted about its pivot to vary the size of the opening and also to vary the position of the shutter itself with respect to the aperture 23 so that the angular direction taken by the air as it is discharged through the opening 23 may be manually set as desired. The ears 35 and 36 are secured together by any suitable means such as a rivet 38.

Means are also provided for continuously changing the position of the shutters by movement of the frame 24. This means comprises a bracket 39 secured at its opposite ends to the frame 24 by means of portions 40 and 41 formed thereon. Each of the portions 40 and 41 has a pair of legs 42 and 43 riveted by rivets 44 and 45 to the frame 24. The bracket 39 and the portions 40 and 41 are made from a single strip of metal, the side edges of the bracket being turned up as indicated at 46 to reenforce the bracket and to make it more rigid as will be readily understood. At its center, the bracket 39 is provided with an enlarged bearing portion 48. The bearing portion 48 is connected by means of a bolt 49 and a nut 50 to an arm 51 which is adapted to be oscillated to cause oscillation of the frame 24. A friction washer 52 is interposed between the arm 51 and the bearing portion 48, and the nut 50 is tightened to such an extent that, by supplying an excessive amount of force, the bracket 39 can be turned relative to the arm 51 for the purpose of adjusting the angular position of the shutters carried by the frame 24 with respect to the arm 51 in the plane of the aperture 23.

Thus, the arc through which the frame 24 is oscillated may be changed to the most desirable position after the heater is installed in the automobile.

Figure 4:
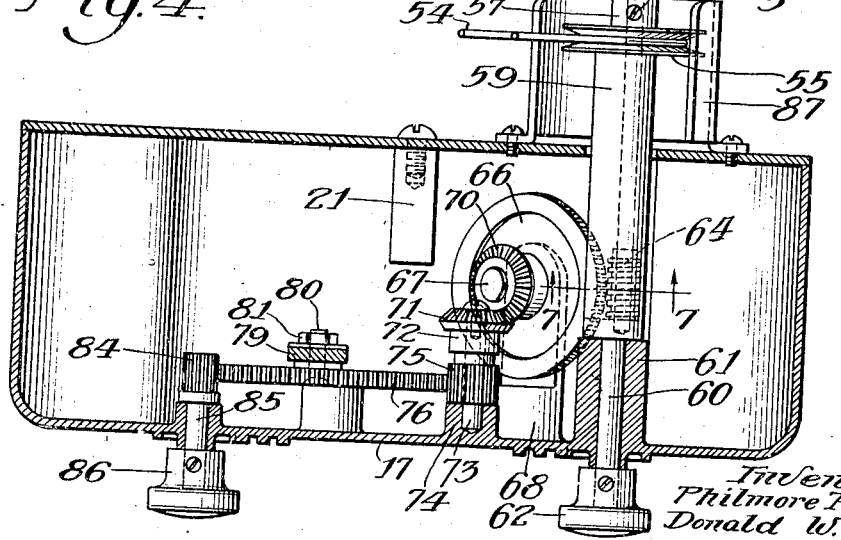
Fig. 4 is a sectional view on the line 4—4 of Fig. 3.

The arm 51 is actuated by means of a suitable driving mechanism which is operated from the fan motor 13. This driving mechanism comprises a pulley 53 on the motor shaft 18 and a belt 54 which desirably is an elastic belt such as one constructed of rubber. The belt 54 drives a pulley 55 which is mounted on a shaft 56 by means of a hub 57 and a set screw 58 shown most clearly in Fig. 4. The shaft 56 is journalled eccentrically in a sleeve 59 which sleeve is carried by a stub shaft 60 integral therewith. The stub shaft 60 is journalled in a bearing 61 formed on the housing 17 and has thereon at the front of the housing a handle 62 by means of which the shaft 60 and the sleeve 59 can be rotated. The sleeve 59 has an enlarged recess 63 therein in which a worm 64 fixed on the shaft 56 operates. The sleeve 59 has an opening 65 therein so that a worm gear 66 may engage the worm 64 through the opening 65.

As shown best by Figs. 7 and 8, the sleeve 59 provides a means for moving the worm 64 into and out of meshing engagement with the worm gear 66. The elastic belt 54 permits the movement of the pulley 55 and the shaft 56 necessary for engaging or disengaging the worm 64 without interfering with the driving connection between the pulleys 53 and 55. The worm gear 66 is journalled on a shaft 67 which is fixed to a block 68 formed on the housing 17. The worm gear 66 has a hub 69 which also has thereon a bevelled gear 70 which meshes with a bevelled gear 71 which has a hub 72 carried on a shaft 73 that is mounted in a boss 74 on the housing 17. The hub 72 also has fixed thereon a pinion 75 which pinion meshes with a gear 76 that is rotatably secured by means of a stub shaft 77 screw threaded into a boss 78 on the housing 17.

The gear 76 has a link 79 eccentrically mounted thereon by means of a bolt 80 and a nut 81. The link 79 is connected at its other end to the free end of the arm 51 by means of a bolt 82 and a nut 83. It is evident that rotation of the gear 76 will cause the link 79 to oscillate the arm 51 and thus oscillate the frame 24.

It is desirable in certain instances when the frame is not being oscillated by power to adjust it by hand. For this purpose, there is provided a pinion 84 meshing with the gear 76 and mounted on a shaft 85 which is journalled in the housing 17. The shaft 85 carries a handle 86 by means of which the pinion 84 can be rotated.

When it is desired to adjust the position of the frame 24 by hand, the handle 62 is first turned so as to cause the sleeve 59 to separate the worm 64 and the worm gear 66, thus disconnecting the drive from the motor 13 to the worm gear 66. After this has been done, the handle 86 can be rotated to adjust the position of the frame 24 to any point desired within the range provided by the oscillation of the arm 51. Should it be desired to change the angular position of the frame 24 so that it will oscillate in a different arc, this can be accomplished by holding the knob 86 stationary thereby holding the gear 76, the link 79, and the arm 51 stationary so that the frame 24 can be turned by hand to change the position of the arm 51 with respect to the frame by causing rotation of the bearing portion 48 on the pivot 49 while the arm 51 is held stationary.

In order to shield the pulley 55 and the belt 54, the end plate 16 has mounted thereon a shield 87 which projects out over the pulley 55.

While certain embodiments of the invention have been shown and described, it is to be understood that it is capable of many modifications. Changes, therefore, in the construction and arrangements may be made without departing from the spirit and scope of the invention as disclosed in the appended claims in which it is the intention to claim all novelty inherent in the invention as broadly as possible in view of the prior art.

Having thus described the invention, what we claim as new and desire to secure by Letters Patent is:

1. Air distributing means of the character described comprising, a housing member having an aperture therein, a frame journalled for rotation in said aperture, a plurality of shutters carried by said frame member and adjustable to control the air passage through said aperture, a crank arm on said frame, and power driven means for oscillating said crank arm, said power driven means comprising a motor, a worm driven by said motor, a train of gears driven by said worm and including a gear having a pivot pin eccentrically mounted thereon, and a link connecting said pivot pin with said crank arm.

2. Air distributing means of the character described comprising, a housing member having an aperture therein, a frame journalled for rotation in said aperture, a plurality of shutters carried by said frame member and adjustable to control the air passage through said aperture, a crank arm on said frame, and power driven means for oscillating said crank arm, said power driven means comprising a motor, a worm driven by said motor, a train of gears driven by said worm and including a gear having a pivot pin eccentrically mounted thereon, and a link connecting said pivot pin with said crank arm, said worm being movable manually into and out of engagement with the train of gears.

3. Air distributing means of the character described comprising, a housing member having an aperture therein, a frame journalled for rotation in said aperture, a plurality of shutters carried by said frame member and adjustable to control the air passage through said aperture, a crank arm on said frame, and power driven means for oscillating said crank arm, said power driven means comprising a motor, a worm driven by said motor, a train of gears driven by said worm and including a gear having a pivot pin eccentrically mounted thereon, and a link connecting said pivot pin with said crank arm, said worm being movable manually into and out of engagement with the train of gears, and manual means for operating said train of gears when the worm is disengaged therefrom.

4. Air distributing means comprising a housing having apertures therein on opposite sides thereof, a power driven fan at one of said apertures, a shaft for said fan driving air through said housing, a frame having a rim journalled in the other aperture, said frame having a shutter hinged thereon, drive mechanism from said shaft to said frame including a gear train and a clutch mechanism for connecting said shaft to said gear train, and manually operable means connected to said gear train for moving the frame.

5. Apparatus for distributing air comprising a housing having an aperture through which air is advanced, a frame having means mounted thereon for controlling and directing the air passing through said aperture, means pivotally mounting said frame for rotation in a plane parallel to the plane of said aperture, and power driven mechanism for moving said frame member about its pivotal mounting, said power driven mechanism comprising a crank arm on said frame, a link pivoted to said crank arm, and a drive gear having a pin eccentrically mounted thereon to which said link is secured.

6. Apparatus for distributing air comprising a housing having an aperture through which air is advanced, a frame having means thereon for controlling and directing the air passing through said aperture, means pivotally mounting said frame for rotation in a plane parallel to the plane of said aperture, and power driven mechanism for moving said frame member about its pivotal mounting, said power driven mechanism comprising a crank arm on said frame member, a link pivoted to said crank arm, a drive gear having a pin eccentrically mounted thereon to which said link is secured, a worm for driving said gear, a worm gear for driving said worm, and manually operable means for engaging and disengaging said worm with the worm gear.

PHILMORE F. SPERRY.
DONALD W. LAKE.